(12) United States Patent
Qi

(10) Patent No.: US 8,980,181 B2
(45) Date of Patent: Mar. 17, 2015

(54) AMMONIA GENERATING AND DELIVERY APPARATUS

(71) Applicant: Baohua Qi, Columbus, IN (US)

(72) Inventor: Baohua Qi, Columbus, IN (US)

( * ) Notice: Subject to any disclaimer, the term of this patent is extended or adjusted under 35 U.S.C. 154(b) by 0 days.

(21) Appl. No.: 14/201,797

(22) Filed: Mar. 8, 2014

(65) Prior Publication Data

US 2014/0286829 A1     Sep. 25, 2014

Related U.S. Application Data

(60) Provisional application No. 61/803,751, filed on Mar. 20, 2013.

(51) Int. Cl.
*F01N 3/20* (2006.01)

(52) U.S. Cl.
CPC .............. *F01N 3/208* (2013.01); *F01N 2610/10* (2013.01); *F01N 2610/105* (2013.01); *F01N 2610/12* (2013.01); *F01N 2610/14* (2013.01); *F01N 2610/1406* (2013.01); *F01N 2900/1602* (2013.01); *F01N 2900/1808* (2013.01)
USPC ............................ 422/111; 422/148; 422/110

(58) Field of Classification Search
CPC .................................................. F01N 2240/25
USPC .......................................................... 422/148
See application file for complete search history.

(56) References Cited

U.S. PATENT DOCUMENTS 8,088,336 B2 * 1/2012 Suzuki et al. ................. 422/148

* cited by examiner

*Primary Examiner* — Lessanework Seifu

(57) ABSTRACT

An ammonia generating and delivery apparatus generating ammonia by heating a precursor material with a heating device controlled by a temperature pulse controller which receives commands from a pressure controller, and delivering ammonia with a flow rate controlled by a three-stage PWM controller. The temperature pulse controller is used in a first feedback loop to create a temperature pulse sequence at a surface of the heating device. A pressure controller in a second feedback loop provides duty-cycle commands to the temperature pulse controller, while in delivering ammonia, effects of pressure variation to delivery accuracy are compensated in the three-stage PWM controller, which includes a flow-rate feedback loop. The ammonia generating and delivery apparatus can also include two containers, in which the precursor material in one container is charged and discharged according to the capability of the other container in generating ammonia.

20 Claims, 14 Drawing Sheets

AMMONIA GENERATING AND DELIVERY APPARATUS

This present application claims priority from U.S. provisional application No. 61/803,751 having the same title as the present invention and filed on Mar. 20, 2013.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

This invention relates to an ammonia generating and delivery apparatus, and more particularly, to an apparatus in which ammonia is generated by heating a precursor material and delivered with a controlled delivery rate.

BACKGROUND OF THE INVENTION

Selective Catalytic Reduction (SCR) technology has been broadly used in reducing NOx emissions of internal combustion engines, especially diesel engines. In a SCR system, typically ammonia (NH3) needs to be mixed with exhaust gas of an engine and then the result mixture passes through a catalyst where ammonia reacts with NOx in the exhaust gas and reduces NOx to nitrogen and water. Due to safety concerns and difficulties in transportation and storage, in SCR systems, normally ammonia is generated from a precursor, such as urea, rather than being used directly. The precursor is also called reductant.

Both solid and liquid reductants can be used in a SCR system. Generating ammonia from solid reductants, e.g. metal ammine salts, such as magnesium ammine chloride $(Mg(NH_3)_6Cl_2)$ and calcium ammine chloride $(Ca(NH_3)_8Cl_2)$, and ammonium salts, such as ammonium carbamate $(NH_4COONH_2)$ and ammonium carbonate $((NH_4)_2CO_3)$, has a few advantages compared to dosing liquid urea solution (e.g. DEF or Diesel Exhaust Fluid), including no freezing temperature, no deposit concerns in the decomposition pipe, higher density and lower volume, insensitivity to impurities in the reductant, and no extra energy needed for heating water in the urea solution. However a hindrance for using solid reductants is the issues in delivering the reductant, including high energy consumption, pressure variation, and delivery rate control problems. These issues make it difficult to deliver solid reductants accurately as required.

Normally, to use solid reductant in generating ammonia, reductant in an air-tight container is heated as taught in [Chemical Engineering Science 61 (2006) 2618-2625], and then ammonia gas is released to exhaust air after a pressure is built in the container. Since when heating the solid reductant, all reductant in the container is heated, high heating power is needed and it is difficult to control the pressure in the container, especially when the quantity of reductant is large, due to time delay caused by heat transfer. Changes in pressure affect ammonia delivery accuracy, especially when a feedback control, which may significantly increase system complexity and cost, is not available. And overly high pressure may also create safety concerns.

To solve the problems mentioned above, it is then an objective of the present invention to provide an ammonia generating and delivery apparatus in which an average ammonia releasing rate can be controlled by controlling not only the temperature of a reductant, but also the releasing time, thereby average heating power can be lowered and a more precise control of ammonia releasing rate can be achieved.

A further objective of the present invention is to provide a closed loop pressure control in the ammonia generating and delivery apparatus for obtaining a stable ammonia pressure.

Yet another objective of the present invention is to provide an ammonia delivery control in the ammonia generating and delivery apparatus controlling ammonia delivery rate with a feedback loop including only virtual sensors, so that an accurate ammonia delivery rate can be obtained without significantly increasing the system complexity and cost.

Yet another objective of the present invention is to provide an ammonia generating and delivery apparatus with short response time, so that ammonia can be quickly delivered.

BRIEF SUMMARY OF THE INVENTION

The present invention provides an apparatus and method for generating ammonia and delivering ammonia with a controlled flow rate. In one embodiment of the present invention, a container with a heating device holds a precursor material, i.e. a reductant, from which ammonia is generated when its temperature is above an ammonia releasing temperature. The heating device is controlled by a pulse temperature controller, which generates a temperature pulse sequence at a surface of the heating device. Each pulse in the temperature pulse sequence includes a high temperature section, in which the temperature at the surface of the heating device is above the ammonia releasing temperature, and a low temperature section, in which the surface temperature of the heating device is below the ammonia releasing temperature. With the temperature pulses, the reductant in adjacent to the heating device releases ammonia only when its surface temperature is above the ammonia releasing temperature. Thereby, by controlling the duty cycle of the temperature pulses, an ammonia releasing rate can be controlled. In an example of the pulse temperature controller for controlling an electrical heater, the resistance of the electrical heater is used in a closed loop control for generating the temperature pulse, and a PWM generator is used in driving the electrical heater.

In the embodiment of the present invention, the container is fluidly coupled to a buffer through a check valve, which keeps the gas in the buffer from flowing back to the container. In the buffer, a pressure sensor is used for sensing the pressure inside the buffer, and the pressure sensing value is used by a pressure controller for maintaining the pressure in the buffer within a predetermined range. In an example of the pressure controller, a constant target pressure value is compared to the sensing value obtained from the pressure sensor, and the error or the difference between the two values is used by the pressure controller to generate a temperature duty-cycle command for the pulse temperature controller. With the dual-loop control, i.e., with the pressure loop and temperature loop control, pressure in the buffer is controlled by precisely adjusting the ammonia releasing rate in the container with the temperature pulse control.

In the embodiment of the present invention, the buffer is further fluidly connected to an injector, and an ammonia delivery rate can be controlled by controlling the open time of the injector in a repeating cycle. If only ammonia is generated in the container, then the ammonia delivery rate is a mass flow rate of the gas flowing through the injector, while when multi-species are produced in the container, a correction factor is used in determining the ammonia delivery rate. To accurately control the ammonia delivery rate, a three stage PWM control can be used. In this PWM control, a first stage PWM signal is generated by periodically updating the duty cycle of a second stage PWM signal generator, and the duty cycle value is calculated according to a flow amount value in the current cycle calculated with the pressure sensing value. The time from the moment when a first PWM cycle starts to the current moment and the period and the duty cycle values of the second PWM signal are further used in determining the duty cycle of a third stage PWM signal. With the three stage PWM control, a feedback control of flow rate can be achieved without using a dedicated flow sensor, while a pull-in voltage and a hold-in voltage can be provided for controlling the injector.

In another embodiment of the present invention, two containers are used for generating and delivering ammonia. Both of these two containers have heating devices inside, and the first container is fluidly coupled to the second container through a heat exchanger and a check valve, which keeps gas in the second container from flowing back to the first container. In the first container, the heating device includes an exhaust gas heater and a first electrical heater, while in the second container, a second electrical heater is used for heating the reductant. The temperature and pressure inside the second container are detected respectively with a temperature sensor and a pressure sensor. In an exemplary controller, a pulse temperature control is used in heating controls, and the pressure inside the second container is controlled by a pressure controller generating duty-cycle commands for the pulse temperature control with sensing values obtained from the pressure sensor. The second container is used as a buffer supporting the first container in delivering ammonia, and a saturation value, which is indicative of a reductant capability in generating ammonia, is calculated based on the temperature and the pressure sensing values. The heating control using the second electrical heater is enabled for discharging the reductant in the second container when the exhaust gas heater in the first container is not capable in generating ammonia, or when the saturation value is high to avoid the reducant from being overly charged, and disabled for charging the reductant when the heating control of the first container is enabled.

BRIEF DESCRIPTION OF THE DRAWINGS

FIG. 2c is a block diagram of a pulse temperature controller for controlling the electrical heater in the ammonia generating and delivery system of FIG. 2a.

FIG. 2f is a block diagram of a pressure controller generating a temperature duty-cycle for the pulse temperature controller in the ammonia generating and delivery system of FIG. 2a.

FIG. 2g is a block diagram of a three-stage PWM controller for controlling an ammonia delivery rate in the ammonia generating and delivery system of FIG. 2a.

FIG. 3b is a flow chart of a timer interrupt service routine, running periodically for controlling the heating devices in the ammonia generating and delivery apparatus of FIG. 3a.

DETAILED DESCRIPTION OF THE INVENTION

Figure 1:
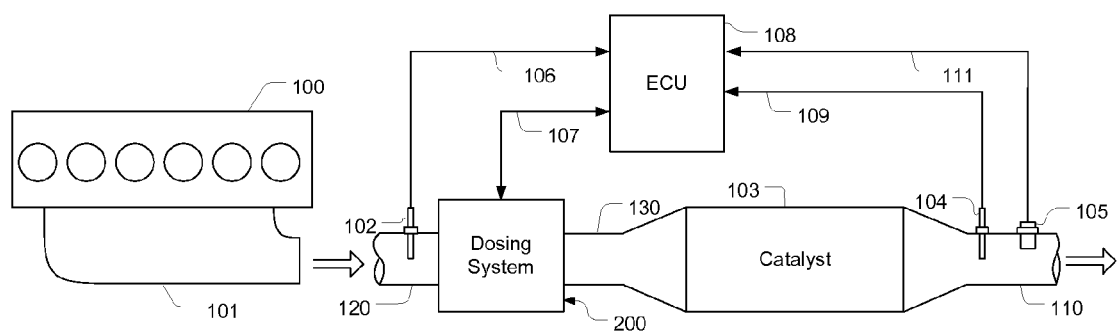
FIG. 1 is a schematic representation of an internal combustion engine with a SCR exhaust gas treatment system.

Referring to FIG. 1, in an engine exhaust gas treatment system, an exhaust gas generated by an engine 100 enters a passage 120 through a manifold 101. The passage 120 is fluidly connected to a dosing system 200, which is controlled by an ECU (Engine Control Unit) 108 through signal lines 107. Inside the dosing system 200, reductant is delivered and mixed with the exhaust gas. And through a passage 130, the result mixed air flows into a catalyst 103, where reductant reacts with the NOx in the exhaust gas and reduces it. On the passage 120, a temperature sensor 102 is used to measure the temperature of the exhaust gas upstream from the catalyst 103 and the sensing signals are sent to the ECU 108 via signal lines 106. A temperature sensor 104 installed on a tail pipe 110, which is fluidly connected to the catalyst 103, is used to measure the exhaust gas temperature downstream from the catalyst 103, and the sensing signals are obtained by the ECU 108 through signal lines 109. On the tailpipe 110, there is also a NOx sensor 105 used to measure a NOx emission level at the tailpipe. The sensing signals obtained from the NOx sensor 105 is sent to the ECU 108 through signal lines 111.

Figure 2A:
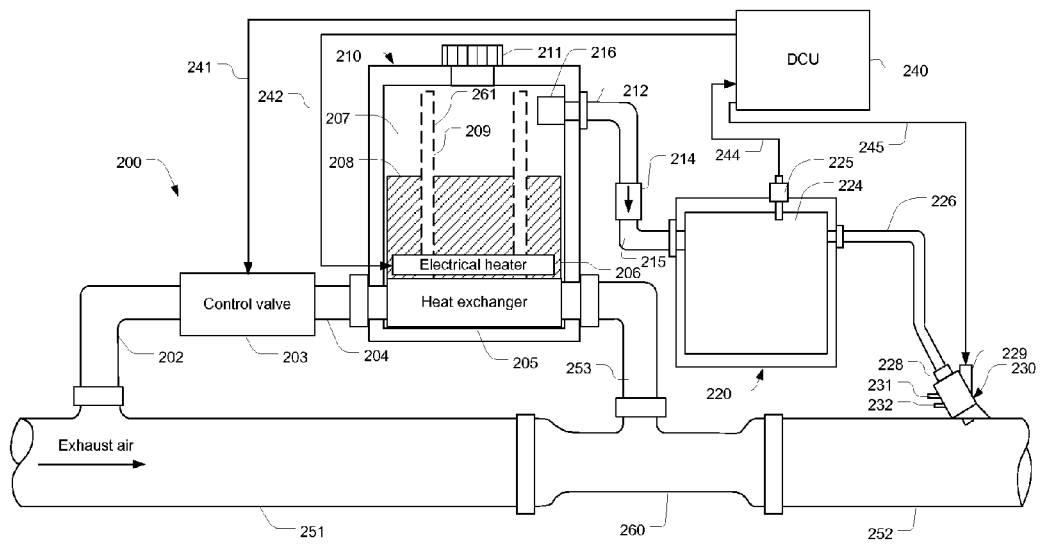
FIG. 2a depicts an ammonia generating and delivery system with a reductant container and a buffer.

An embodiment of the dosing system 200 is depicted in FIG. 2a. Inside the dosing system, the exhaust gas firstly enters a passage 251 and through a branch passage 202, a control valve 203, which is controlled by a DCU (Dosing Control Unit) 240 through signal lines 241, and a passage 204, part of the exhaust air flows into a heat exchanger 205 of an ammonia generation chamber 210. The DCU 240 communicates with the ECU 108 through signal lines 106 (not shown in FIG. 2a), and the outlet of the heat exchanger 205 is fluidly coupled to the low pressure port of a Venturi pipe 260 through a passage 253. The high pressure inlet port of the Venturi pipe 260 is fluidly connected to the passage 251, while the high pressure outlet port is fluidly connected to a passage 252, on which an injector 230 is installed for delivering ammonia. In a container 207 of the ammonia generation chamber 210, an electrical heater 206 is positioned above the heat exchanger 205 and controlled by the DCU 240 through signal lines 242. Inside the container 207, a solid reductant 208 is filled through a cap 211, and gas releasing pipes 209 with small openings 261 are used to release gas generated inside the bulk solid reductant 208. The container 207 is fluidly coupled to a container 224 of a buffer chamber 220 through a passage 212, a check valve 214, and another passage 215. Gas pressure in the container 224 is measured by a pressure sensor 225 connected to the DCU 240 through signals lines 244, and under the pressure, the ammonia gas is delivered by the injector 230, which is fluid connected to the chamber 224 through a passage 226 and a port 228. The injector 230 is controlled by the DCU 240 though signal lines 245 connected to a socket 229. To prevent the injector 230 from overheating, engine coolant can be circulated inside the injector through ports 231 and 232.

Unlike liquid reductant solution, metering solid reductant is difficult. And normally a bulk solid reducant has to be heated to reach its decomposition temperature for releasing ammonia. Heating the bulk solid reductant is time consuming and energy consuming, especially when electrical heating is used. To solve this problem, a special pulse control is used in electrical heating. In the pulse control, high current pulses are applied to the electrical heater, resulting in a temporary high surface temperature at high pulse level, which decomposes the adjacent solid reductant. At low pulse level, the heater surface temperature drops below the decomposition temperature, and the heating energy adsorbed by the solid reductant during decomposition further lowers the heater surface temperature. Thereby, the average ammonia releasing rate under the pulse control is determined by the duty cycle of the applied current pulse. Different from the PWM control typically used in heating control, the pulse control is a temperature pulse control, in which temperature is controlled in pulses rather than at a constant level.

Figure 2B:
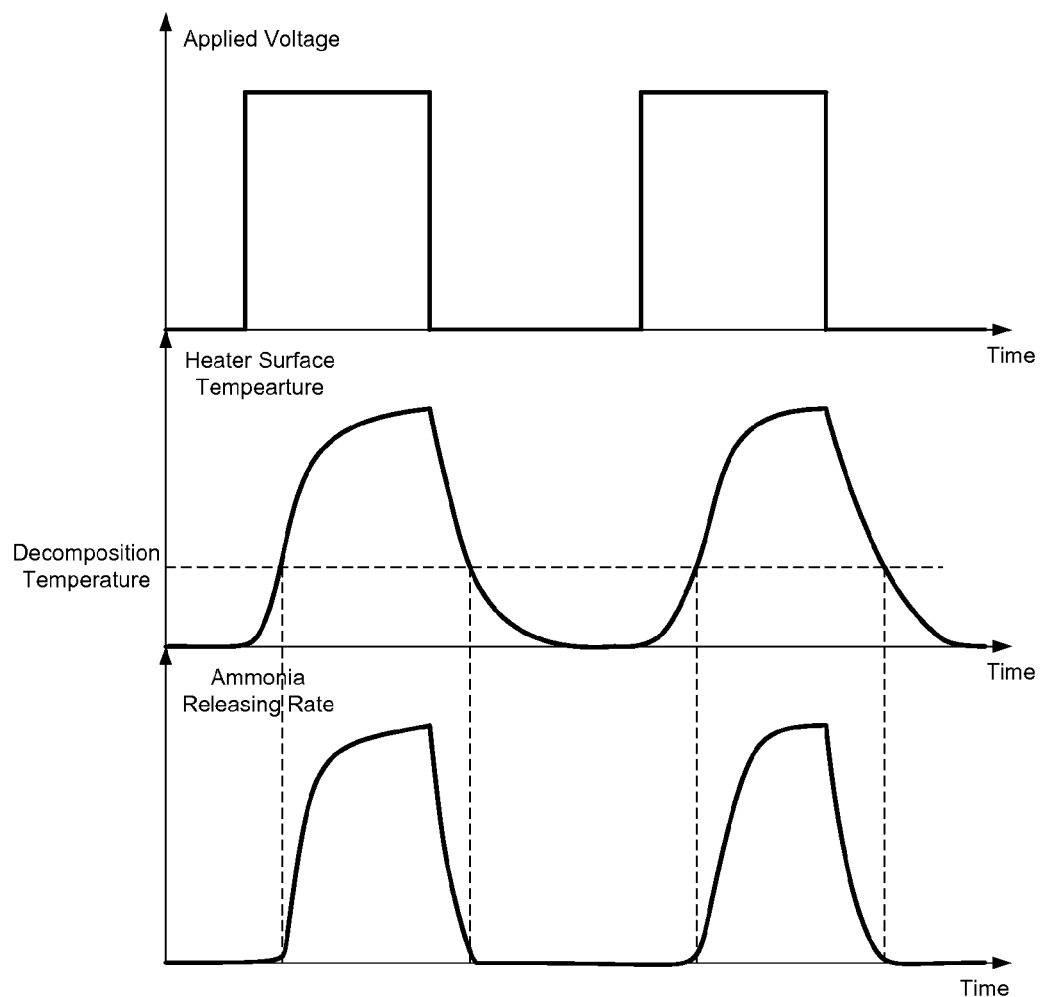
FIG. 2b shows a timing chart of an applied voltage to the electrical heater in the ammonia generating and delivery system of FIG. 2a, a temperature response curve, and an ammonia releasing-rate curve.

In a system of FIG. 2a, a simple temperature control is applying a voltage pulse on the electrical heater 206. As shown in FIG. 2b, when the voltage pulse is applied, the heater surface temperature rises. And when the heater temperature is above the ammonia releasing temperature, the solid reductant then decomposes and releases ammonia. The ammonia releasing rate is determined by the heater temperature, and the higher the heater temperature is, the higher the ammonia releasing rate. When the voltage pulse is off, the heater surface temperature drops. The solid reductant stops decomposing when the heater temperature drops below the decomposition temperature.

Figure 2C:
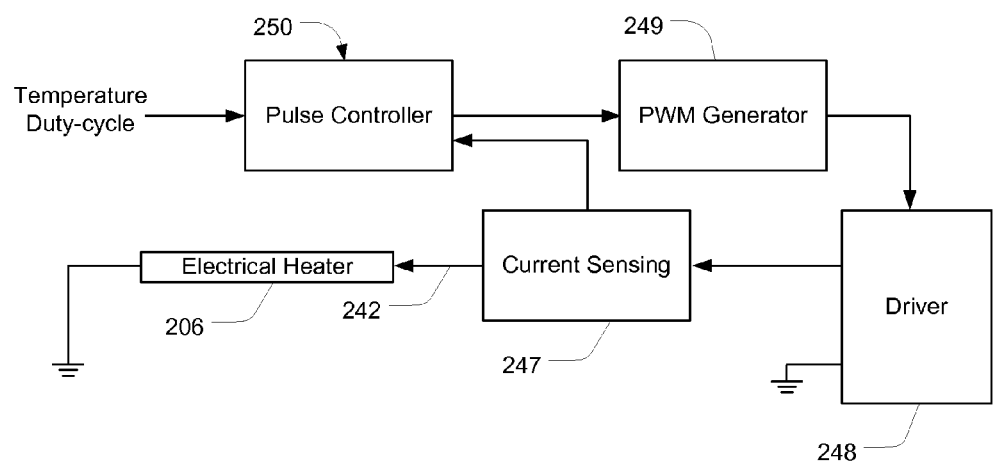

The temperature pulse can be further controlled in a closed loop, and when the temperature dependent resistance characteristics of the electrical heater are known, the heater surface temperature can also be obtained by measuring the heater resistance. Referring to FIG. 2c, in a closed-loop temperature control, a current sensing block 247 is used to detect the current applied to the electrical heater 206, and the sensing signals are sent to a pulse controller 250, which then generates setting values to a PWM generator 249. Through a driver 248, a PWM signal produced by the PWM generator 249 is converted to a driving signal, which is applied to the electrical heater 206 through the current sensing block 247 and the signal lines 242.

A variety of methods can be used for current sensing, for example, a simple method is measuring the voltage drop across a shunt resistor, which is connected in series to the electrical heater, while a switch circuit can be used in the driver block 248 for applying the driving signal. In the PWM generator block 249, a PWM signal with a fixed period value can be generated with a control logic circuit according to a duty-cycle command provided by the pulse controller block 250.

Figure 2D:
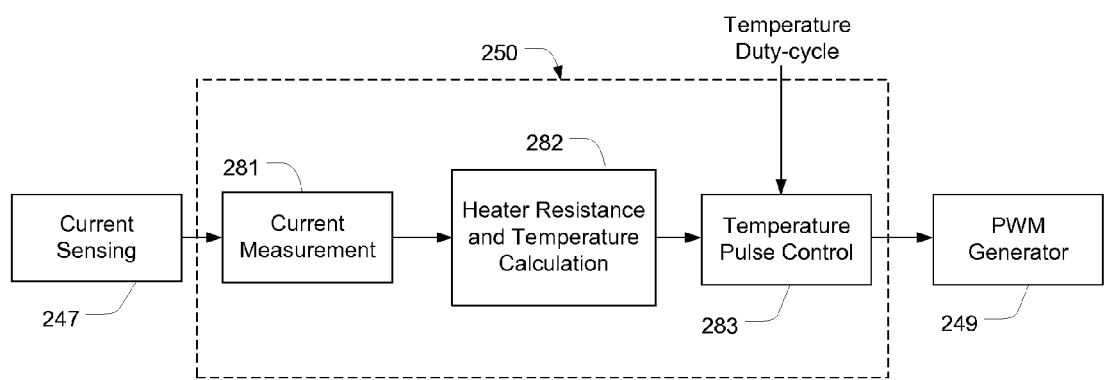
FIG. 2d shows a block diagram of the pulse controller in the pulse temperature controller of FIG. 2c.

The pulse controller block 250 is a closed loop controller using the sensing signals obtained from the current sensing block 247 as a feedback and providing control commands to the PWM generator block 249 according to the sensing signals and a temperature duty-cycle command. An exemplary realization of the pulse controller block 250 is shown in FIG. 2d. In the pulse controller block, sensing signals obtained from the current sensing block 247 are converted to digital values in a current measurement block 281, and in a heater resistance and temperature calculation block 282, the resistance of the electrical heater 206 is calculated with the applied voltage and the current sensing values, and the heater temperature is calculated according to the temperature-dependent resistance curve of the electrical heater. The result temperature values are then used by a temperature pulse control block 283 in generating the control commands for the PWM generator 249 according to the temperature duty-cycle command.

Figure 2E:
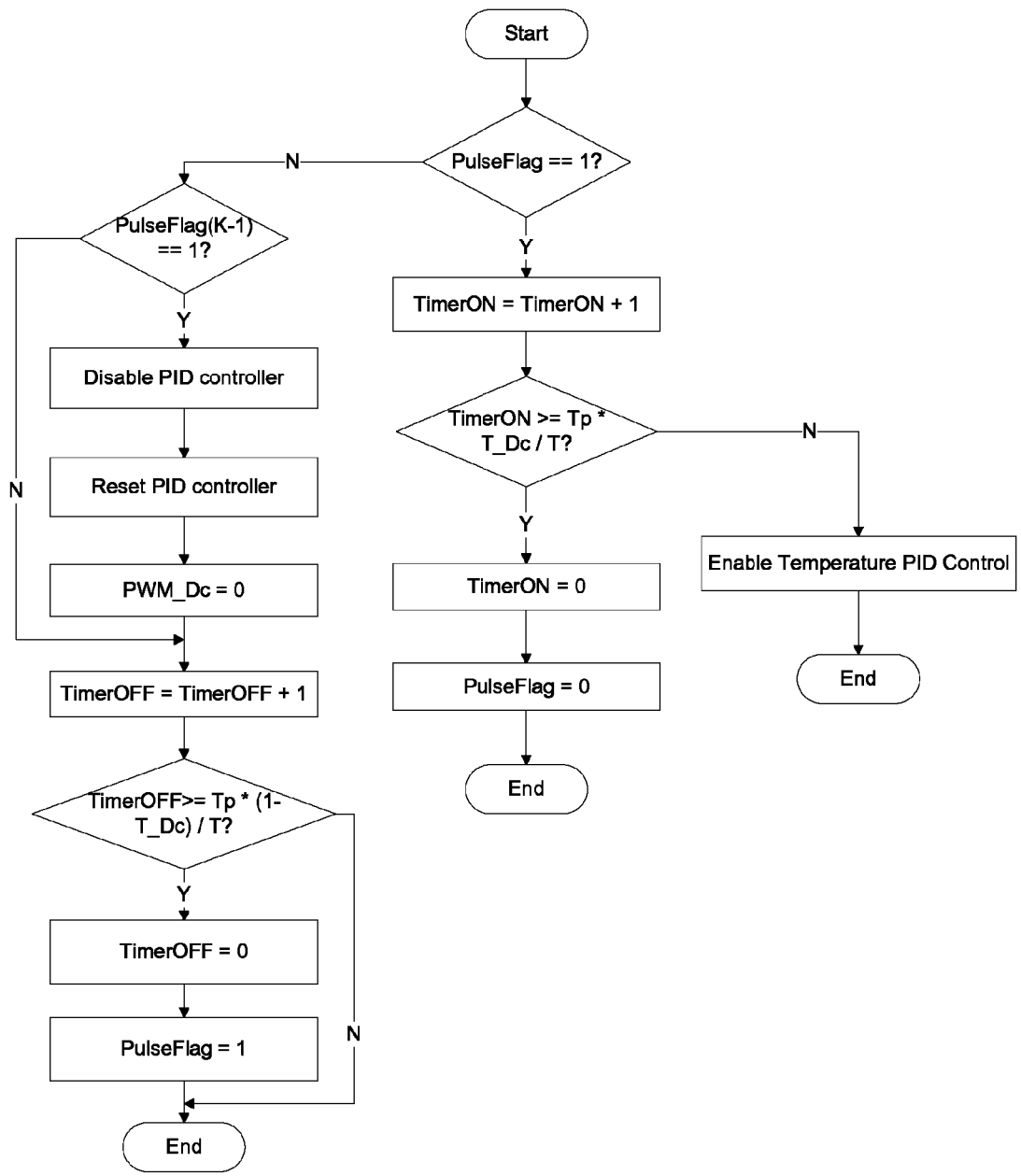
FIG. 2e is a flow chart of an interrupt service routine, which runs periodically for a timer interrupt, functioning as the temperature pulse control block in the pulse controller of FIG. 2d.

The analog-to-digital conversion in the current measurement block 281 can be accomplished with an Analog-to-Digital Converter (ADC) device, while the resistance and temperature calculation in the block 282 can be realized with a routine in a microprocessor. In the routine, the heater temperature is calculated using a lookup table with an input of the heater resistance value and the lookup table can be populated with the temperature dependent resistance values of the electrical heater. In the temperature pulse control block 283, a variety of control methods can be used. An exemplary control method is a PID based pulse control realized with an interrupt service routine running periodically for a timer interrupt. Referring to FIG. 2e, in such a routine, a flag PulseFlag is examined first. If the PulseFlag value is 1, then a timer TimerON is incremented. The TimerON value is compared with a term Tp*T_Dc/T thereafter, where Tp is the period of the temperature control pulse; T_Dc is the duty cycle of the temperature control pulse, and T is the period of the timer interrupt. If the TimerON value is lower than the term Tp*T_Dc/T, then a temperature PID control is enabled and the routine ends. Otherwise, the routine ends after the timer TimerON is reset to zero, and a zero value is assigned to the flag PulseFlag. Referring back to examination of the PulseFlag value, if it is not 1, then the PulseFlag value in the previous cycle, PulseFlag(K−1), is examined. If the PulseFlag(K−1) value is 1, i.e., there is a change of the PulseFlag value from one to zero, then the PID controller is disabled and reset, and the PWM duty-cycle command, PWM_Dc, is set to zero. A timer TimerOFF is incremented thereafter, and the result TimerOFF value is compared to a term Tp*(1−T_Dc)/T. If the TImerOFF value is lower than the term Tp*(1−T_Dc)/T, then the routine ends, otherwise, the routine ends after the timer TimerOFF is reset to zero and a value of one is assigned to the flag PulseFlag.

Figure 2F:
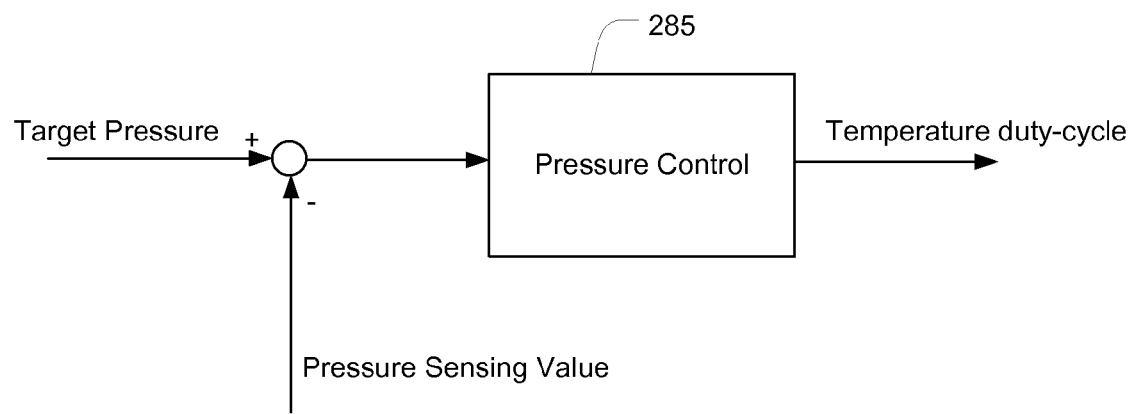

Referring back to FIG. 2c, the temperature duty-cycle command to the pulse controller 250 can be provided by a pressure control as shown in FIG. 2f. The pressure control is used for controlling the pressure in the chamber 224 (FIG. 2a) to a target pressure value. In the pressure control, the target pressure value is compared with a pressure sensing value obtained from the pressure sensor 225 in the chamber 224 (FIG. 2a), and the result error is used by a pressure controller 285 in generating the temperature duty-cycle command. The pressure controller 285 is a feedback controller, and a variety of controls, including PID controls and relay controls can be used in the pressure controller.

In the system of FIG. 2a, when exhaust temperature is higher than the decomposition temperature of the solid reductant in the chamber 210, the control valve 203 can be energized open to allow exhaust gas passing through the heat exchanger 205 to heat the solid reductant. When the exhaust gas heating is enabled, the pressure control block 285 of FIG. 2f further generates a control command for the control valve 203 in addition to the temperature duty-cycle command for the temperature pulse control, in which the electrical heater 206 is used. A variety of methods can be used in controlling the control valve 203. A simple method is a relay control with a lower pressure threshold Thd_PLo and an upper pressure threshold Thd_PHi. When the pressure sensing value obtained from the pressure sensor 225 is lower than Thd_PLo, then the control valve 203 is energized open, and if the pressure sensing value is higher than Thd_PHi, then the control valve 203 is de-energized closed. When the exhaust gas heating works simultaneously with the electrical heating, the thresholds Thd_PLo and Thd_PHi can be determined according to requirements to the system performance. For example, when an accurate pressure control is required, then the upper threshold Thd_Phi can be set lower than the target pressure value. In this way, the exhaust gas heating is used as a coarse control, and a "fine tune" is achieved by the electrical heating. If lower electrical heating consumption is required, then the lower threshold Thd_PLo can be set higher than the target pressure value. Thereby, whenever the exhaust gas is able to bring enough heat energy, the electrical heater 206 is de-energized off. Note that the exhaust gas heating in the system of FIG. 2a is to provide an alternate heating means saving electrical energy. When a solid reductant with low decomposition temperature, e.g. ammonium bicarbonate, is used, engine coolant or engine oil can also be used as the alternate heating means, and similar controls as that with the exhaust gas heating can be used in controlling the ammonia pressure.

Figure 2G:
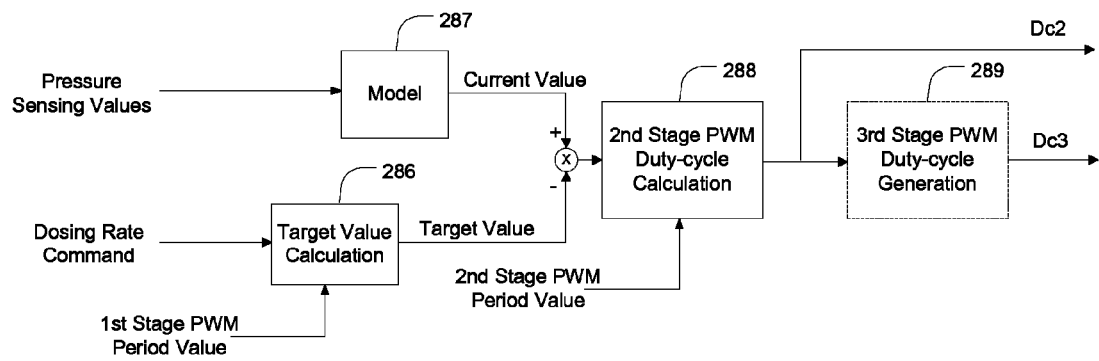

Ammonia delivery rate in the system of FIG. 2a can be controlled by using a PWM method adjusting the open time of the injector 230 in a repeating cycle, according to a command provided by a SCR control, and pressure sensing values obtained from the pressure sensor 225. To better compensate pressure variations in the chamber 224, a three-stage PWM control can be used in generating a control signal for the injector 230. As shown in FIG. 2g, in this control, sensing values obtained from the pressure sensor 225 are used by a model block 287 in generating a current value of ammonia delivery amount in a repeating cycle of a first stage PWM signal, while the command provided by the SCR control together with a first stage period value are sent to a target value calculation block 286, where a target value of ammonia delivery amount in a repeating cycle is generated. The target and the current values are compared to each other and the result error or difference value together with a second stage PWM period value are used by a block 288 to calculate a duty cycle value Dc2 for a second stage PWM signal. To have a fast response while at the same time avoid overheating, normally a pull-in and a hold-in voltage need to be provided in controlling an injector solenoid. The pull-in and hold-in voltages can be generated using a third PWM signal, the duty-cycle of which, Dc3, is calculated in a block 289.

Figure 2H:
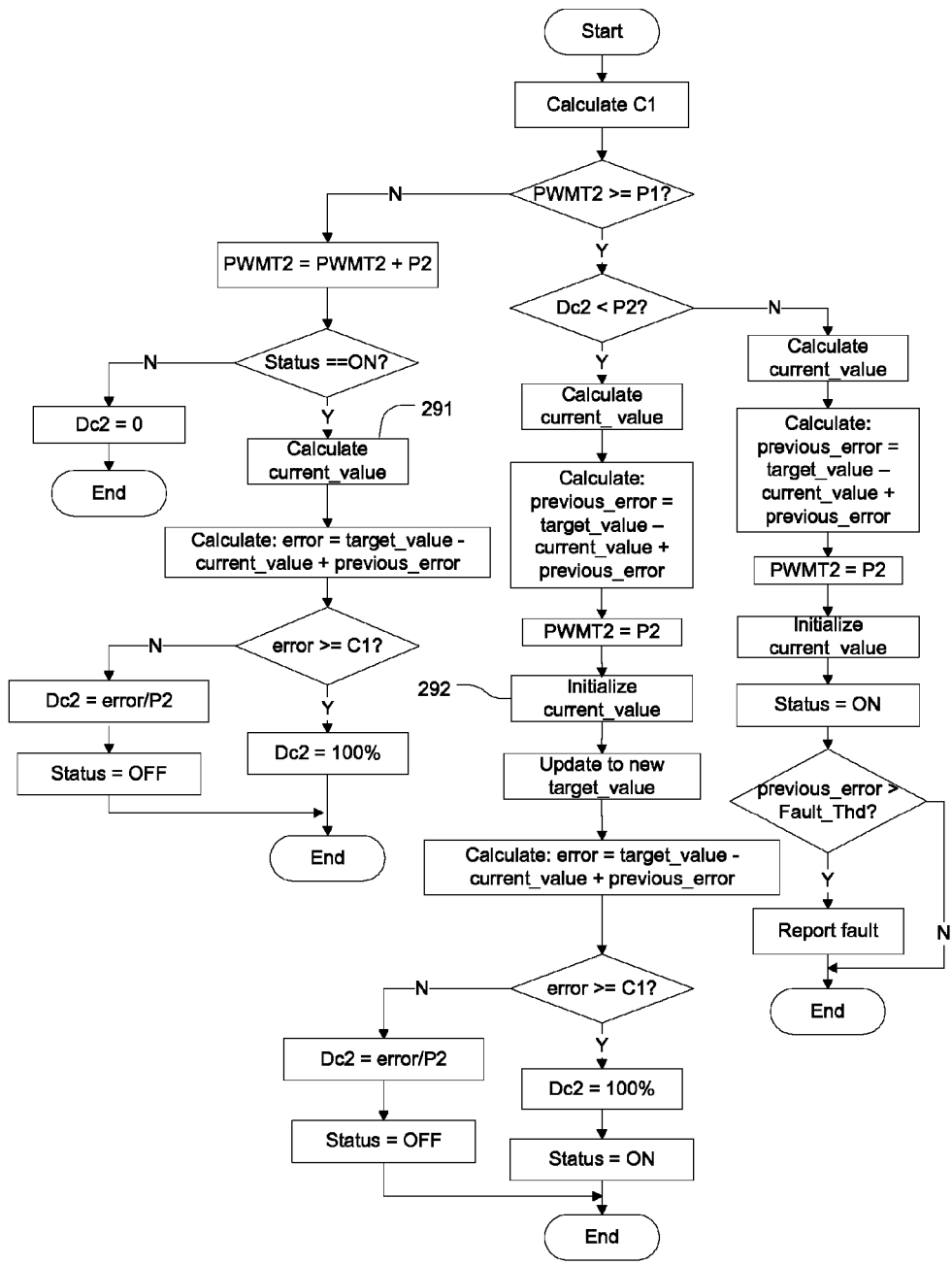
FIG. 2h is a flow chart of a timer interrupt service routine running periodically for generating a two-stage PWM signal in the three-stage PWM controller of FIG. 2g.

The functions of the blocks 286, 287, and 288 together with the comparison between the current value and the target value can be realized in a service routine for a timer-based interrupt running periodically with a time interval of P2, which is also the period value of the second stage PWM signal. A flow chart of an exemplary routine is shown in FIG. 2h. In this chart, Fault_Thd is a constant value, and P1 is the period value of the first-stage PWM signal. Status is a PWM pulse status flag. The variable target_value contains the target on-time value of the first-stage PWM signal, while the variable current_value saves the calculated on-time value of the first-stage PWM signal at the current moment. The variable PWMT2 saves the current time in a first-stage PWM cycle, and values of the variable C1 are indicative of the PWM capacity of the second-stage PWM control, i.e., the ammonia delivery amount when the injector 230 is energized open for a period of time P2.

When the interrupt routine is triggered, the C1 value is calculated, and the value of PWMT2 is compared to the period value P1 of the first-stage PWM signal. If the current cycle is finished, i.e., PWMT2>=P1, then the duty-cycle value of the second stage PWM signal, Dc2, is examined. When the Dc2 value is lower than P2, the total error of the current PWM cycle is calculated and saved in a variable previous_error. The current_value is initialized thereafter in a step 292, in which the P2 value and the variable target_value are updated for a new cycle. And the error to be corrected in the current cycle is calculated by adding the current error to the error in the previous cycle. If the error to be corrected is equal to or higher than C1, then the Dc2 value is set to 100%, and the Status flag is set to ON, otherwise, the Dc2 value is calculated with a term error/P2, and the Status flag is reset to OFF. The routine ends thereafter. Referring back to the comparison between the PWMT2 value and the P1 value, if the current cycle ends (PWMT2>=P1) with the duty-cycle value not lower than P2, then it means the error cannot be corrected in this PWM cycle. In this case, the error in the previous cycle is calculated and after the PWMT2 value is set to P2. The current_value is initialized thereafter, and the Status flag is set to ON. Since the error is not corrected, it is accumulated. If the accumulated error is higher than the threshold Fault_Thd, then the routine ends after a fault is reported. Referring back to the comparison between the PWMT2 value and the P1 value again, when the PWMT2 value is lower than P1 (the routine is called again in the same first-stage PWM cycle), the PWMT2 value is incremented by P2, and the Status flag is examined. If the Status flag is OFF, then the Dc2 value is cleared to 0, and the routine ends, otherwise, the current_value is calculated in a step 291 and the error to be corrected is updated thereafter. Before the routine ends, this error value is compared to C1. If the error value is equal or greater than C1, then the Dc2 value is set to 100%, otherwise, the routine ends after the Dc2 value is calculated using the term error/P2 and the Status flag is reset to OFF.

In the interrupt routine of FIG. 2h, the target_value can be calculated with a reductant mass-flow rate command using the following formula:

$$\text{target\_value}(i) = \text{Mass\_flow\_rate\_cmd} * S_0 \tag{F1},$$

where Mass_flow_rate_cmd is the reductant mass-flow command, and $S_0$ is the period value of the first stage PWM signal. The formula for calculating the current_value in the step 291 can be:

$$\text{current\_value}(i) = K * \text{sqrt}(Pr(i) - Pc)) * P2 + \text{current\_value}(i-1) \tag{F2},$$

where i is the number of interrupts since PWMT2 is reset to P2:

$$i = \text{PWMT2}/P2 \tag{F3};$$

sqrt is the square root calculation, K a pre-determined constant, Pr(i) the pressure sensing value for the calculation in the i-th interrupt cycle, and Pc the pressure in the exhaust passage 252. The constant K can be calculated using the discharge coefficient of the injector, $C_D$, the minimum area of the injector nozzle, $A_n$, and the density of the reductant, $\rho$:

$$K = C_D' A_n' \sqrt{2\rho} \tag{1},$$

and the value of current_value(1) is set to 0 in the step 292. And the C1 value can be calculated using the following equation:

$$C1 = K*\text{sqrt}(Pr(i)-Pc))*P2 \tag{F4}$$

Figure 2I:
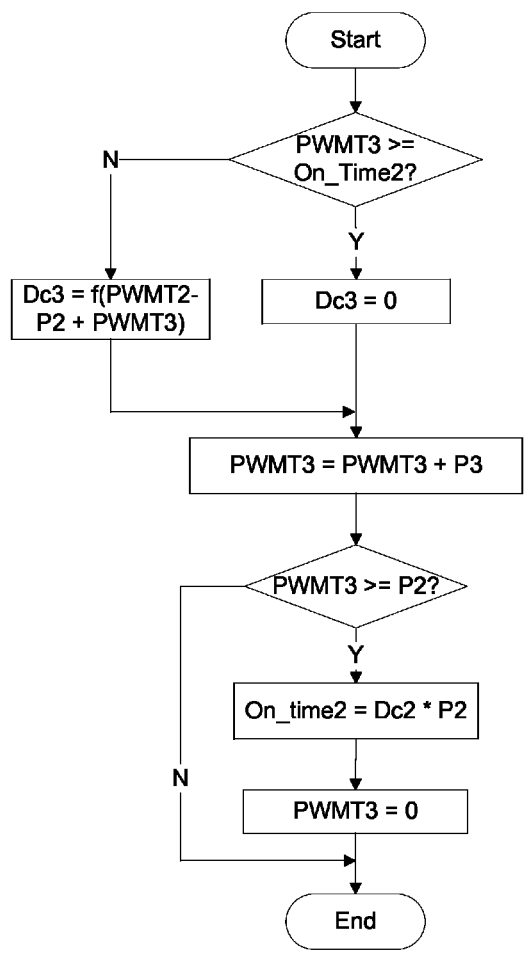
FIG. 2i is a flow chart of a timer interrupt service routine, running periodically for generating a third stage PWM signal in the three-stage PWM controller of FIG. 2g.

In the dosing control of FIG. 2g, the function of the block 289 can be realized in a service routine running periodically for a timer interrupt. Referring to FIG. 2i, this routine starts with comparing the value in a timer PWMT3 with an on-time value of the second stage PWM signal, On_Time2. If the PWMT3 value is lower than the On_Time2 value, then the duty-cycle value of the third stage PWM signal, Dc3, is calculated with a function of a time term, PWMT2−P2+PWMT3. This time term is the time in a repeating cycle of the first stage PWM signal starting from the moment when the cycle is triggered. A lookup table with an input of the time term can be used in this calculation, so that more voltage levels can be generated. If the PWMT3 value is not lower than the On_Time2 value, then the Dc3 value is reset to 0. The PWMT3 value is incremented by P3 thereafter, where P3 is the period value of the third stage PWM signal, and the PWMT3 value is compared with the P2 value. The routine ends if the PWMT3 value is lower than the P2 value, otherwise, before the routine ends, the On_time2 value is updated using the product of the Dc2 value and the P2 value, and the PWMT3 value is reset to 0.

Figure 3A:
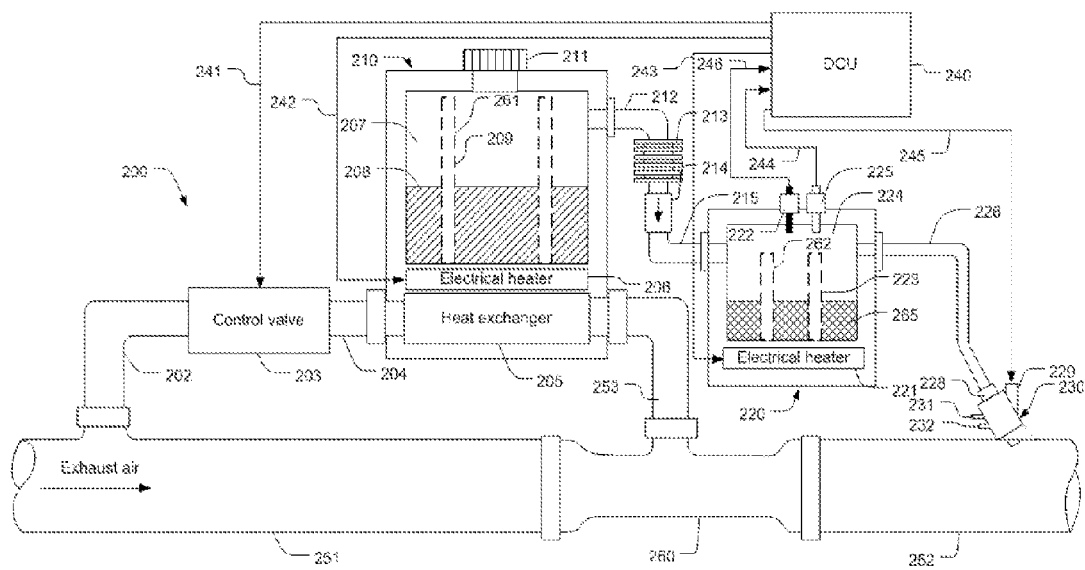
FIG. 3a depicts an ammonia generating and delivery system with two reductant containers.

In the system of FIG. 2a, solid metal amines can be used to further increase the buffer capacity. As shown in FIG. 3a, in the container 224, solid metal amines 265 are contained inside and gas releasing pipes 223 with small openings 262 are used for releasing gas generated in the bulk metal amines. The container 224 is heated by an electrical heater 221, which is controlled by the DCU 240 through signal lines 243, and a heat exchanger 213 connected in between the passage 212 and the check valve 214 is used to cool down the gas passing through it. The temperature inside the container 224 is further measured by a temperature sensor 222, which communicates with the DCU 240 through signal lines 246.

In the system of FIG. 3a, the ammonia generation chamber 210 and the buffer chamber 220 can work in series in providing ammonia. In this mode, when the engine has a cold start, the exhaust air temperature is low. A temperature control using the electrical heater 221 in the buffer chamber 220 is enabled, and metal amines in the container 224 are then heated. When ammonia gas is released through the gas releasing pipes 223 and the surface of the metal amines, gas pressure is built up in the container 224. When exhaust air temperature measured by the temperature sensor 102 (FIG. 1) increases above a threshold determined by a reductant decomposition temperature, the exhaust gas heating control is enabled.

Ammonia gas released in the chamber 210 goes into the chamber 220 via the heat exchanger 213 and the check valve 214 if the gas pressure in the container 207 is higher than that in the container 224. When the generation of ammonia gas in the container 207 is detected by the pressure sensing value obtained from the pressure sensor 225, the temperature control with the electrical heater 221 can be disabled. Since through the heat exchanger 213, the temperature of the feeding gas to the container 224 is lower than the decomposition temperature of metal amines inside it, the metal amines stops decomposition and a charging process starts under the gas pressure. The ammonia supply is then provided solely by heating solid reductant in the chamber 210. During the operation of the system, if the charging time of the metal amines is longer than a threshold, then the temperature control with the heater 221 is enabled for keeping metal amines from being overly charged. Thus after engine stops running, when the control valve 203, the electrical heaters 206 and 221 are de-energized, the ammonia gas in the container 207 and 224 can be absorbed by the metal amines.

Figure 3B:
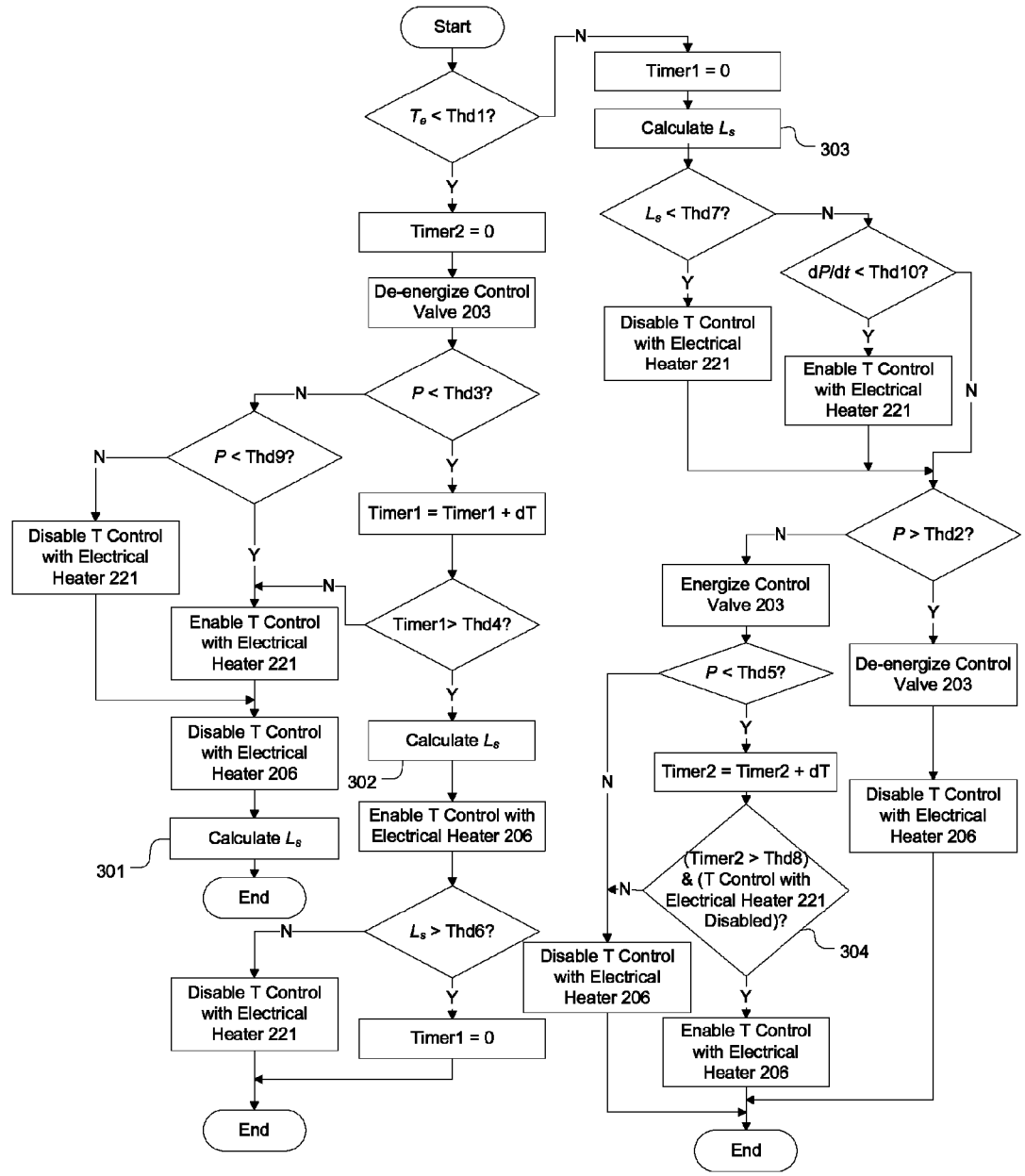

The series control can be realized using a timer interrupt service routine run periodically in the DCU 240. An example routine is shown in FIG. 3b. In this example, after the routine starts, the exhaust temperature $T_e$, which is obtained from the temperature sensor 102 (FIG. 1) is compared to a threshold Thd1. If the exhaust temperature is lower than the threshold Thd1, then a timer Timer1, the value of which is an indication of the heat exchanger ineffective time, is reset to 0, and the control valve 203 (FIG. 3a) is de-energized closed. The pressure value P obtained from the pressure sensor 225 is examined thereafter. If the pressure value P is not lower than a threshold Thd3, then temperature control with the electrical heater 221 is enabled when the pressure value P is lower than a threshold Thd9, and the temperature control with the temperature control with the electrical heater 206 is enabled. If the pressure value P is not lower than the threshold Thd9, then the pressure in the container 224 is too high, and the temperature controls with the electrical heater 204 and 206 are all disabled. The routine ends after the value of $L_s$, which is an indication of a saturation level of metal amines, is calculated in a step 301. Referring back to the comparison of the pressure value P with the threshold Thd3, if P is lower than Thd3, then the value of a timer Time 1, which is used to indicate the incapable time of the temperature control with the electrical heater 221, is incremented by an interrupt period time dT, and the incremented value is compared to a threshold Thd4. If it is higher than Thd4, then the saturation level $L_s$ is calculated and the temperature control with the electrical heater 206 is enabled to produce ammonia gas in the chamber 220, otherwise, like that when the pressure P is lower than the threshold Thd3, the temperature control with the electrical heater 221 is enabled as that with the electrical heater 206 being disabled, and the $L_s$ value is calculated in the step 301 before the routine ends. After the temperature control with the electrical heater 206 is enabled, the metal amines in the chamber 224 can be recharged. The $L_s$ value is then compared to a threshold Thd6. If it is higher than the threshold Th6, then the charging is completed and the timer Timer1 is set to 0 before the routine ends, otherwise, the temperature control with the electrical heater 221 is disabled and the routine ends.

Referring back to the comparison between the temperature $T_e$ and the threshold Thd1, if $T_e$ is not lower than Thd1, then the timer Timer1 is set to 0, and in a step 303, the saturation level $L_s$ is calculated. If the metal amines are not overly-charged, i.e., when $L_s$ is lower than Thd7, the temperature control with the heater 221 is disabled, otherwise, the pressure changing rate dP/dt is examined. If the pressure changing rate is lower than a threshold Thd10, the temperature control with the electrical heater 221 is enabled to discharge the overly-charged metal amines, otherwise, the pressure changing rate is too high to start a discharging process, and the temperature control with the electrical heater 221 is kept as its previous status. After the temperature control with the electrical heater 221 is determined, the pressure P is compared to a threshold Thd2. If it is higher than the threshold Thd2, then the pressure is too high, the control valve 203 is then de-energized closed and the temperature control with the electrical heater 206 is disabled, otherwise, the control valve 203 is energized and the pressure P is compared to a threshold Thd5. If it is lower than the threshold Thd5, then the value of the timer Timer2 is incremented by dT, and the temperature control with the electrical heater 206 is enabled under a cold condition, in which the Timer2 value is higher than a threshold Thd8 and the temperature control with the electrical heater 221 is disabled. The temperature control with the electrical heater 206 is disabled when the P value is not lower than Thd5, or the cold condition is not satisfied. And the routine ends thereafter.

In the control algorithm of FIG. 3b, when the control valve 203 is de-energized and the electrical heater 221 is used for generating ammonia, the pressure P in the container 224 is controlled within the thresholds Thd3 and Thd9. Therefore, the value of Thd3 should be lower than that of Thd9. Similarly, when the control valve 203 is energized, the pressure P is controlled within the thresholds Thd5 and Thd2, and the value of Thd5 should be lower than that of Thd2.

The saturation level $L_s$ can be calculated using pressure sensing values obtained from the sensor 225 and temperature sensing values obtained from the sensor 222. If the pressure change is small compared to the pressure value, when discharging, the NH3 releasing rate $r_n$ is a function of heating temperature and the saturation level of metal amines indicated by the powder weight:

$$r_n = f(L_s, T_c) \qquad (2).$$

In the apparatus of FIG. 3a, $T_c$ is the temperature in the chamber 224 obtained from the sensor, and under the same ambient conditions, the temperature $T_c$ is a function of the heating power $P_a$ applied to the heater 221:

$$T_c = g(P_a) \qquad (3).$$

If the mass-flow rate through the injector 230 is D, if no gas is fed into the container 224, then according to the ideal gas low, $$PV = \left( n_0 + \frac{\int_{t_0}^{t}(r_n - D)\,dt}{M_w} \right) RT_c, \qquad (4)$$

where $M_w$ is the molecular weight of NH3; $n_0$ is the molar value of the gas in the container 224 at time $t_0$; V is the gas volume in the container 224, and R is the gas constant. If the volume change of the metal amines is neglected, then the gas volume V is a fixed value. When the temperature $T_c$ changes much slower than that of the pressure P, the changing rate of pressure, dP/dt, according to equation (4) is $$dP/dt = \frac{r_n - D}{M_w V} RT_c. \qquad (5)$$

By combining equation (5) with equation (2), we have $$dP/dt = \frac{f(L_s, T_c) - D}{M_w V} RT_c \qquad (6)$$

and $$dP/dt = \frac{f(L_s, g(P_a)) - D}{M_w V} Rg(P_a). \qquad (7)$$

According to equation (6) and (7), $L_s$ can be calculated with the changing rate dP/dt, the mass-flow rate D, and the temperature $T_c$ or the power $P_a$ applied to the heater 221 if effects of ambient condition change are insignificant. During charging, the weight changing rate of metal amines, $r_c$, is a function of the temperature $T_c$, the saturation level $L_s$, and the pressure P:

$$r_c = h(L_s, P, T_c) \qquad (8).$$

The changing rate $r_c$ is also proportional to the changing rate of the saturation level $L_s$:

$$r_c = m_c dL_s/dt \qquad (9),$$

where $m_c$ is the theoretical charging capacity of the metal amines, i.e., the mass of the metal amines when fully charged, in the container 224. According to equations (8) and (9), we have $$dL_s/dt = h(L_s, P, T_c)/m_c \qquad (10).$$

Given an initial value, $L_s$ can be calculated according to equation (10).

In the step 301, the calculation of $L_s$ is for discharging of the metal amines, therefore, the equations (6) or (7) is applied. In real-time control, to reduce execution time, a two-step lookup table method can be used in the calculation. In this method, the first step is using a three-dimensional lookup table with two inputs of the applied power $P_a$ or the temperature $T_c$ and the pressure changing rate dP/dt to calculate the molar changing rate of gas in the chamber 224, $(f(L_s, g(P_a))-D)/M_w$ or $(f(L_s, T_c)-D)/M_w$. And then $r_n$ is calculated with the molar changing rate and the mass-flow rate D, which can be further calculated using reductant dosing commands, and $L_s$ is calculated with another three-dimensional lookup table with two inputs of the calculated molar changing rate and the applied power $P_a$ or the temperature $T_c$. The element values in the first lookup table can be calculated according to equation (6) or (7) with the gas volume V determined, while the second lookup table can be populated with testing results obtained from a matrix test with different controlled chamber temperatures and starting saturation levels. If the pressure P varies significantly, then a compensation for pressure is also needed in calculating the saturation level.

Figure 3C:
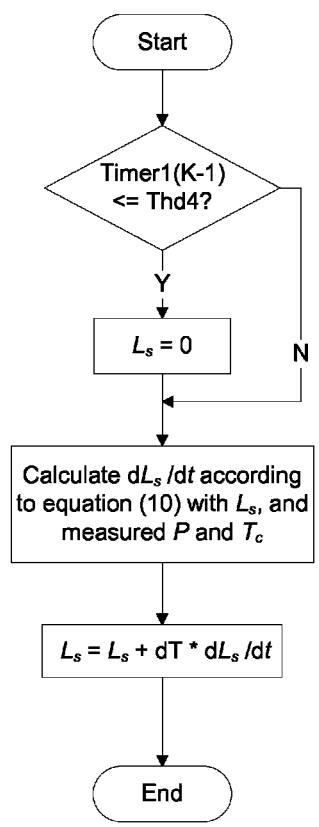
FIG. 3c is a flow chart of a routine for calculating a saturation value in the step 302 of the interrupt service routine shown in FIG. 3b.

In the calculation of the step 302, since the calculation of $L_s$ is for charging of the metal amines, equation (10) can be applied. Referring to FIG. 3b, the calculation of $L_s$ in the step 302 starts only when insufficient ammonia gas is generated by heating the electrical heater 221, i.e., the Timer1 value is higher than the threshold Thd4. If the electrical heater 221 works normally, then insufficient generation of ammonia gas is caused by depleted metal amines, therefore, in the first execution of the step 302, the initial value of $L_s$ can be set to 0. An exemplary calculation algorithm of the step 302 is shown FIG. 3c. This algorithm starts with checking the value of Timer1 in the previous cycle, K−1, where K is the number of the current cycle. If it is lower than or equal to the threshold Thd4, then this cycle is the first one in which the step 302, and the value of $L_s$ is set to 0. The value of $dL_s/dt$ is calculated thereafter according to equation (10) with the previously determined $L_s$ value, and the measured pressure P and temperature $T_c$. Then the value of $L_s$ in the current cycle is calculated with the previous determined $L_s$ value and calculated changing rate, $dL_s/dt$.

Figure 3D:
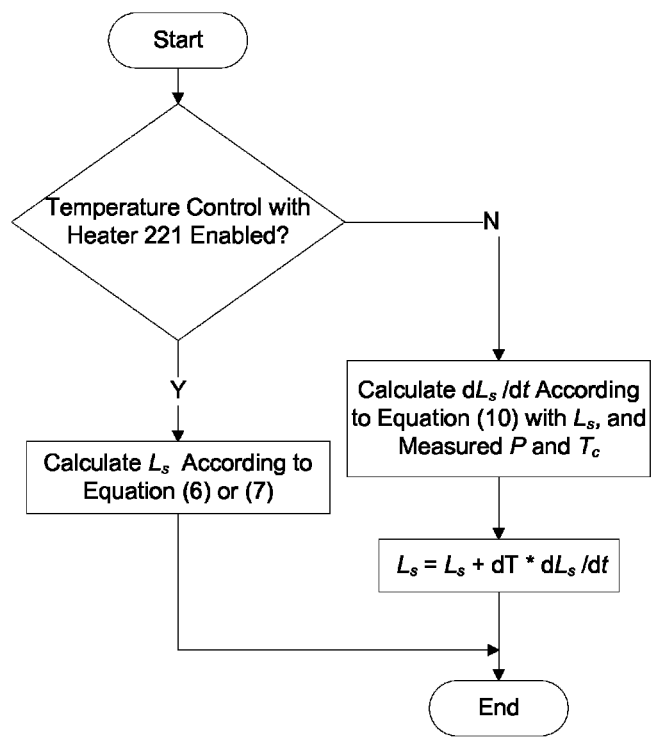
FIG. 3d is a flow chart of a routine for calculating a saturation value in the step 303 of the interrupt service routine shown in FIG. 3b.

Referring back to FIG. 3b, in the step 303, when the temperature control with the heater 221 is disabled, then the calculation is for charging the metal amines, therefore, equation (10) is applied. When the temperature $T_c$ is not lower than the threshold Thd1, since the temperature control with the electrical heater 221 can only be enabled when the pressure P is steady, the release of ammonia under the temperature control creates a higher pressure, blocking ammonia gas in the container 207 from entering the container 224. Thus, the calculation of $L_s$ in this situation is for discharging of the metal amines and the equation (6) or (7) is applied. An exemplary calculation algorithm is depicted in FIG. 3d. This algorithm starts with checking if the status of the temperature control with the electrical heater 221. If it is enabled, then $L_s$ is calculated according to equation (6) or (7) and the method in the step 301 can be used in the calculation, otherwise, as that in the step 302, the changing rate of $L_s$, $dL_s/dt$, is calculated according to equation (10), and $L_s$ is integrated with the changing rate.

In the systems of FIG. 3a, ammonia can be generated from metal amines and other precursor materials. When ammonia is released in heating metal amines, only ammonia is generated. Therefore, the ammonia delivery command of mass flow rate can be calculated from molar flow rate, which is used in SCR dosing controls, according to the following equation:

$$Dc = Mo*Mw\_NH3 \quad (11),$$

where Mo is the ammonia delivery command of molar flow rate, and Mw_NH3 is the molecular weight of ammonia. However, some precursor materials may also release byproducts when ammonia is generated. For example, during decomposition, ammonium bicarbonate releases water, carbon dioxide, and ammonia in a molar ration of 1:1:1. In this situation, a correction factor Fc can be used in the calculation:

$$Dc = Fc*Mo*Mw\_NH3 \quad (12).$$

In the example of ammonium bicarbonate, the Fc value is about 4.65.

In the controls of FIG. 3b, the temperature control with the electrical heater 221 is only enabled when the chamber 210 is not capable in generating ammonia or when a discharging of metal amines in the chamber 210 is required. If the chamber 210 is not capable, then ammonia is only released in heating the metal amines in the chamber 220, therefore, equation (11) can be used in calculating the dosing mass flow rate of ammonia. During discharging, more ammonia is generated in heating the metal amines causing a higher pressure in the chamber 220. Since in the system of FIG. 3a, the check valve 214 keeps the gas generated in the chamber 210 from entering the buffer chamber 220 if the pressure in the buffer chamber 220 is higher than that in the chamber 210, as long as the ammonia releasing rate in the chamber 220 is controlled to maintain a certain pressure drop from the chamber 220 to the chamber 210, ammonia is mainly generated in heating metal amines in the chamber 220, and equation (11) can still be used in calculating the ammonia delivery command of mass flow rate. When such a control is used, a simple routine can be used in calculating the value of the factor Fc. In this routine, if the temperature control with the electrical heater 221 is enabled, then the Fc value is set to 1, i.e., equation (11) is used in calculating the dosing mass flow rate, otherwise, the Fc value is determined by the solid reductant used in the chamber 210, and equation (12) is used in the calculation of dosing mass flow rate.

While the present invention has been depicted and described with reference to only a limited number of particular preferred embodiments, as will be understood by those of skill in the art, changes, modifications, and equivalents in form and function may be made to the invention without departing from the essential characteristics thereof. Accordingly, the invention is intended to be only limited by the spirit and scope as defined in the appended claims, giving full cognizance to equivalents in all respects.

What is claimed is:

1. A control system for generating and delivering ammonia, comprising:
   a reductant container holding materials capable of generating ammonia at a temperature higher than an ammonia releasing temperature,
   a heating device for heating said materials in said reductant container,
   a pressure sensor providing a pressure sensing signal indicative of a pressure of ammonia generated from said materials in said reductant container,
   a temperature controller configured to operate said heating device according to a duty cycle command to generate a temperature pulse sequence at a surface of said heating device, wherein each pulse in said temperature pulse sequence includes a period of on time, during which a temperature at said surface is higher than said ammonia releasing temperature, and a period of off time, during which said temperature at said surface is lower than said ammonia releasing temperature, and
   a pressure controller configured to generate said duty cycle command for said temperature controller to adjust a ratio between said on time and said off time in response to at least said pressure sensing signal and a predetermined pressure target value.

2. The control system according to claim 1, wherein said temperature controller is further configured to generate an on signal and an off signal.

3. The control system according to claim 2, wherein upon said on signal, said heating device is enabled and said heating device is disabled with said off signal.

4. The control system according to claim 2, wherein said temperature controller is further configured to include a closed loop temperature control, which is enabled upon said on signal and disabled with said off signal.

5. The control system according to claim 4, wherein said heating device includes an electrical heater.

6. The control system according to claim 5, wherein said closed loop temperature control is adjusted in response to a resistance of said electrical heater.

7. The control system according to claim 1, wherein said heating device includes an exhaust gas heating unit, comprising a control valve with an inlet fluidly connected to an exhaust pipe of an internal combustion engine, an exhaust gas heat exchanger with an inlet fluidly connected to an outlet of said control valve and a Venturi connector with a low pressure port fluidly connected to an outlet of said exhaust gas heat exchanger and two high pressure ports, one of which is fluidly coupled to said exhaust pipe.

8. The control system according to claim 1, wherein said heating device includes an engine coolant heating unit in which engine coolant is cycled.

9. The control system according to claim 1, wherein said heating device includes an engine oil heating unit in which engine oil is cycled.

10. The control system according to claim 1, further comprising:
    a buffer container fluidly coupled to said reductant container, wherein a temperature sensor and said pressure sensor are positioned in said buffer container for provide a temperature sensing signal and a pressure sensing signal indicative of a temperature and a pressure in said buffer container respectively.

11. The control system according to claim 10, wherein said buffer container is fluidly coupled to said reductant container through a check valve that prevents gas in said buffer container from flowing back to said reductant container.

12. A control system for generating and delivering ammonia, comprising:
    a reductant container holding materials capable of generating ammonia at a temperature higher than an ammonia releasing temperature,
    a heating device for heating said materials in said reductant container, an injector fluidly coupled to said reductant container for controlling an ammonia delivery rate, a pressure sensor providing a pressure sensing signal indicative of a pressure of ammonia generated from said materials in said reductant container, an ammonia generation controller configured to operate said heating device for generating ammonia in said reductant container, and a delivery rate controller configured to operate said injector open and close with a PWM control signal in controlling said ammonia delivery rate, including a second stage controller generating a second stage PWM signal according to a set of second stage control parameters and a first stage controller generating a first stage PWM signal by periodically providing values for said second stage control parameters in response to at least a predetermined target value and said pressure sensing signal.

13. The control system according to claim 12, wherein said second stage control parameters include a duty cycle of said second stage PWM signal.

14. The control system according to claim 12, wherein said delivery rate controller is further configured to include a third stage controller generating a third stage PWM signal according to a set of third stage control parameters, values of which are calculated with values of said second stage parameters and a current time, which is a time period from a moment when said first stage PWM signal is triggered to a moment when said third stage control parameters are calculated.

15. The control system according to claim 14, wherein said third stage control parameters include a duty cycle of said third stage controller, and said second stage control parameters include a duty cycle and a period of said second stage PWM signal.

16. A control system for generating and delivering ammonia, comprising:

a first container holding a first material capable of generating ammonia at a temperature higher than a first ammonia releasing temperature, a first heating device for heating said first material in said first container, a second container, which holds a second material capable of storing ammonia at a temperature lower than an ammonia charging temperature and discharging ammonia at a temperature higher than a second ammonia releasing temperature, fluidly coupled to said first container through a heat exchanger and a check valve preventing gas in said second container from flowing back to said first container, a second heating device for heating said second material in said second container, a pressure sensor providing a pressure sensing signal indicative of a pressure in said second container, a first container controller configured to operate said first heating device for releasing ammonia from said first material, a second container controller configured to operate said second heating device for charging and discharging said second material, an ammonia generation controller configured to enable said second container controller and disable said first container controller when discharging said second material in said second chamber, and enable said first container controller and disable said second container controller when charging said second material in said second container, and a pressure controller configured to provide control commands to said first container controller and said second container controller in response to at least said pressure sensing signal obtained from said pressure controller for maintaining a pressure in said second container within a predetermined range.

17. The control system according to claim 16, wherein said first container controller is further configured to operate said first heating device to generate a first temperature pulse sequence at a surface of said first heating device, and each pulse in said first temperature pulse sequence includes a period of on time, during which a temperature at said surface of said first heating device is higher than said first ammonia releasing temperature, and a period of off time, during which said temperature at said surface of said first heating device is lower than said first ammonia releasing temperature.

18. The control system according to claim 16, wherein said second container controller is further configured to operate said second heating device to generate a second temperature pulse sequence at a surface of said second heating device, and each pulse in said second temperature pulse sequence includes a period of on time, during which a temperature at said surface of said second heating device is higher than said second ammonia releasing temperature, and a period of off time, during which said temperature at said surface of said second heating device is lower than said second ammonia releasing temperature.

19. The control system according to claim 16, further comprising:

a temperature sensor providing a temperature sensing signal indicative of a temperature in said second container, and said ammonia generation controller is further configured to enable and disable said first container controller and said second container controller in response to at least said temperature sensing signal.

20. The control system according to claim 19, further comprising:

a saturation monitor generating a saturation value indicative of an amount of ammonia, which can be generated from said second material when it is fully discharged from its current status, in response to at least said temperature sensing signal and said pressure sensing signal, wherein said ammonia generation controller is further configured to disable said second container controller when said saturation value is higher than a predetermined value.

* * * * *